(12) United States Patent
Charmat

(10) Patent No.: US 7,472,776 B2
(45) Date of Patent: Jan. 6, 2009

(54) DRUM BRAKE

(75) Inventor: Djamel Charmat, South Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 425 days.

(21) Appl. No.: 11/382,982

(22) Filed: May 12, 2006

(65) Prior Publication Data

US 2007/0261928 A1 Nov. 15, 2007

(51) Int. Cl.
*F16D 51/14* (2006.01)
*F16D 65/56* (2006.01)

(52) U.S. Cl. .............. 188/79.55; 188/79.62; 188/79.64; 188/196 BA

(58) Field of Classification Search .................. 188/325, 188/327, 79.51, 79.63, 79.64, 79.55, 79.57, 188/79.62, 196 A, 196 B, 196 BA, 196 D
See application file for complete search history.

(56) References Cited

U.S. PATENT DOCUMENTS

| | | | |
|---|---|---|---|
| 4,502,574 A * | 3/1985 | Spaargaren ........... 188/196 BA |
| 5,480,010 A | 1/1996 | Johannesen | |
| 6,394,237 B1 * | 5/2002 | Asai ......................... 188/79.51 |
| 6,568,513 B1 * | 5/2003 | Doolittle et al. .......... 188/79.56 |
| 7,011,194 B1 | 3/2006 | Doolittle et al. | |
| 7,178,642 B1 * | 2/2007 | Charmat ................... 188/79.52 |
| 7,270,220 B1 * | 9/2007 | Charmat .................. 188/79.56 |

* cited by examiner

*Primary Examiner*—Thomas J Williams
(74) *Attorney, Agent, or Firm*—Leo H. McCormick, Jr.; Sarah Taylor

(57) ABSTRACT

An actuator for a drum brake including a plunger connected through a resilient member to a linkage attached to a web on a brake shoe. A rod extends from the plunger and engages a lever arm that is pivotally retained on the web. The lever engages an extendable strut of an adjuster arrangement through which a running clearance is maintained between the brake shoe and a drum. During a brake application, pressurization fluid acts on the plunger to develop an operational force that is communicated through the resilient member to move the brake shoe into engagement with a drum. Should the operational force overcome the resilient member, the plunger moves toward the linkage and a reactive force is applied through the rod that acts through the lever arm to prevent a pawl from rotating such that a current length of the strut and correspondingly a current running clearance is sustained.

7 Claims, 5 Drawing Sheets

DRUM BRAKE

This invention relates to a drum brake wherein a piston within a wheel cylinder has a plunger that yields in response to a predetermined actuation fluid pressure and supplies a reaction force through a lever to prevent a shaft of an adjustment strut from rotating as the result of the additional movement of first and second brake shoes caused by the predetermined actuation fluid pressure during a brake application.

BACKGROUND OF THE INVENTION

U.S. Pat. Nos. 4,220,227 and 4,502,574 disclose adjuster mechanism for use in a drum brake to control the extension of a strut member and define a running clearance between a friction surface on brake shoes and a drum member. In particular, this type adjuster mechanism includes a pawl carried by a first brake shoe wherein a spring is connected to the pawl and a second brake shoe such that movement of the first brake shoe toward the drum causes the pawl to pivot on the first brake shoe. When a predetermined movement of the brake shoe occurs as through lining wear, the pawl pivots to an extent that a lip on the pawl moves past a tooth on a star wheel and on termination of the brake application, the lip again engages the tooth and rotates the star wheel to cause an extension in the strut member. This adjuster mechanism functions in an adequate manner for most operations, however, should the drum brake be operated under extreme conditions when an input force is applied to move the friction surface on the brake shoe into engagement with the drum it is possible that the lip on the pawl moves past several teeth on the star wheel. Now on return of the pawl to a rest position, an edge of the lip engages the star wheel and rotates the star wheel through an arc corresponding to several teeth such that a desired running clearance is largely reduced or non-existent. Should the running clearance be totally eliminated, the brake will drag until the friction lining is worn away through continued engagement with the drum. Thus, it is important to control the rotation of the star wheel so that the extendable strut is not over adjusted and the brake shoes are maintained with a desired running clearance with respect to the drum. U.S. Pat. No. 7,011,194 discloses structure that includes a yieldable member that collapses to limit the effect of an operational force on expandable strut such that during a single brake application a maximum adjustment is in effect and a minimum running clearance is preserved.

SUMMARY OF THE INVENTION

The present invention provides a drum brake having an actuator that includes a piston with a plunger that is connected to provide a reactive force into an expandable strut by way of a lever arm to oppose the movement of a pawl that rotates a shaft through which the length of the expandable strut is expanded after a brake application.

In more particular detail, the adjuster arrangement for drum brake of a vehicle includes the extendable strut that is located between a first web of a first brake shoe and a second web of a second shoe. The length of the extendable strut establishes the running clearance between the first and second shoes and a drum. The first and second brake shoes are retained on a backing plate that is fixed to the vehicle such that a first end on the first web and a first end on the second web are spaced apart by the extendable strut and a second end on the first web and a second end of the second web is aligned with an anchor on the backing plate. A first spring attached to the first web and connected to a pawl of the adjuster arrangement retained on the second web and a second spring attached to the first web and second web urges the first ends toward an actuator member and the second ends toward the anchor such that in a position of rest the first and second brake shoes are positioned adjacent the drum with a minimum running clearance there between.

The actuator member includes first and second pistons that are responsive to pressurized fluid to develop an actuation force that respectively act on the first and second webs and after overcoming the opposition to the first and second springs moving the first and second brake shoes from the position of rest through the running clearance and into engagement with the drum to effect a brake application. The extendable strut includes a first body that is connected to the first web that has a threaded bore therein, a second body that is connected to the second web that has a smooth bore therein and a shaft with a star wheel located between a threaded section that is mated with the threaded bore in the first body and a smooth section that is located in the smooth bore of the second body and a star wheel located between the threaded section and the smooth section. Movement of the first and second webs by the actuator member causes the pawl to pivot on the second web and when a predetermined pivotal movement occurs, the star wheel is engages such that threaded section is rotate with respect to the threaded bore and the length of the expandable strut is increased to maintain the minimum running clearance. The first piston of the actuator is characterized by a plunger that is connected to the first web through a resilient member. A rod that extends from the plunger and engages a first end of a lever arm that is pivotally retained on the first web while a second end of the lever arm engaging the first body of the expandable strut. The pressurized fluid presented to the wheel cylinder of the actuator member acts on the plunger and is communicated through the resilient member into the linkage member for moving the first web during a brake application. The resilient member resisting the operational force until a predetermined operational force develops that overcomes the opposing force of the resilient member such that the plunger thereafter moves toward the linkage member. Movement of the plunger toward the linkage causes the rod on the plunger to act on the first end of the lever arm causing the lever arm to pivot on the first web and apply a reactive force through the second end into the first body. The reactive force is communicated through the shaft such that the pawl is held in a substantially stationary position and prevented from rotating. With the pawl being held in a stationary position, the star wheel is not engaged on the movement of the first and second webs and thus the predetermined operational force does not affect a current running clearance between the friction surface on the first and second shoes and the drum.

An advantage of the invention resides in that the limiting structure is retained in the actuator member and as a result immediately responds to limit the adjustment of the expandable strut.

An object of the present invention resides in providing a piston for an actuator with a plunger the movement of which provides a resistive force that is communicated to hold a pawl stationary and thus incapable of moving a star wheel through an adjustment of the length of an expandable strut and correspondingly the running clearance of first and second brake shoes and a drum.

DETAILED DESCRIPTION

Figure 1:
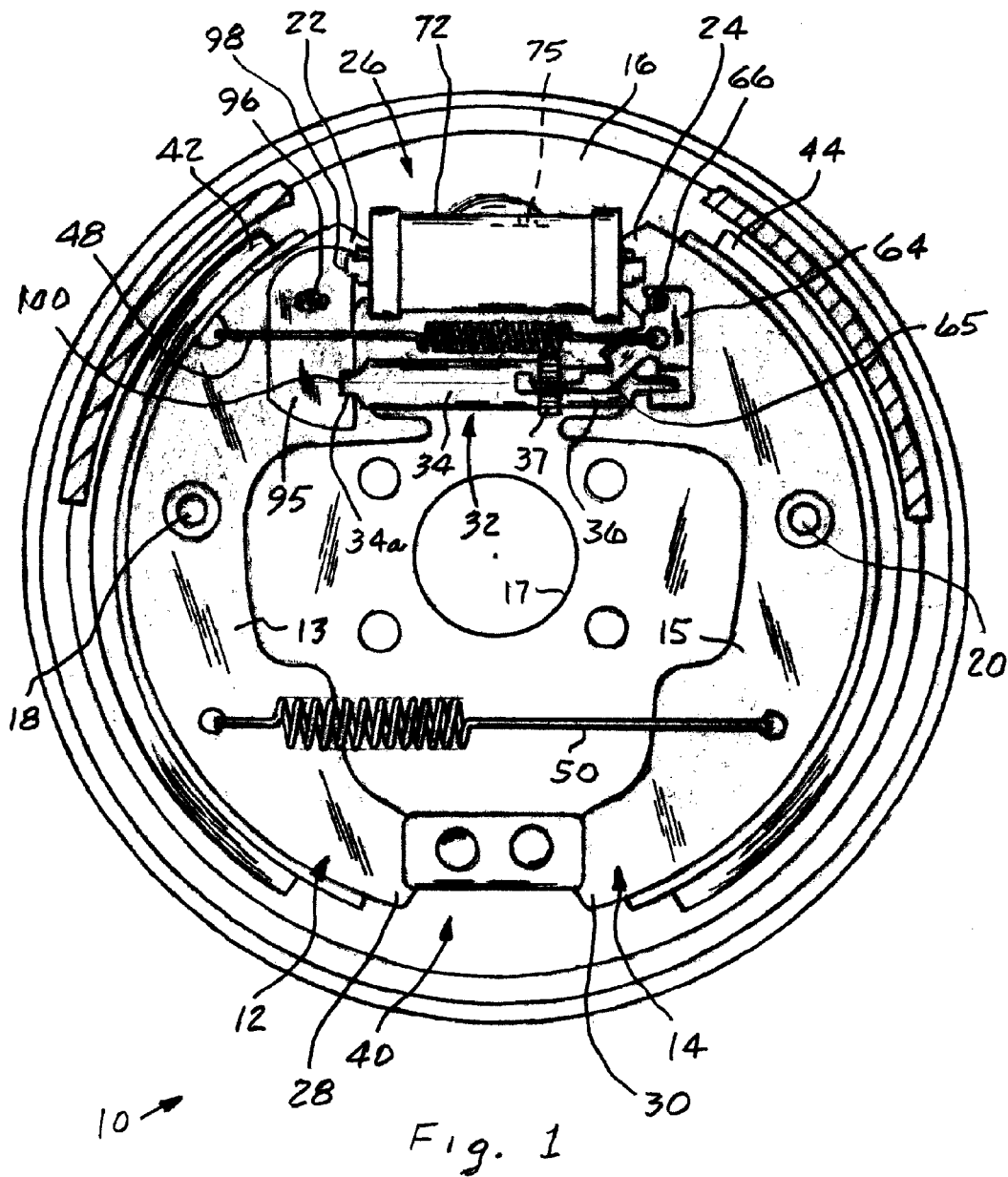
FIG. 1 is schematic illustration of a drum brake according to the present invention with the components thereof in a position of rest.

In the specification where similar components are used the component may be identified by a number or a same number plus depending on a relationship with other components.

The drum brake 10 as shown in FIGS. 1, 2, 3 and 4 includes a backing plate 16 with an opening 17 for receiving an axle shaft of a vehicle. A hydraulic actuator assembly 26 is fixed to the top of the backing plate 16 while an anchor block 40 is fixed to the bottom of the backing plate 16. First 12 and second 14 brake shoes are retained on the backing plate 16 by first 18 and second 20 pins that are connected to the backing plate 16. Brake shoe 12 has a first end 22 and brake shoe 14 has a first end 24, respectively, that are connected to a hydraulic actuator assembly 26 while a second end 28 of brake shoe 12 and a second end 30 of brake shoes 14 are respectively connected to anchor block 40. An extendible strut mechanism 32 of a type illustrated in U.S. Pat. Nos. 4,502,574 and 5,480,010 is located between the web 13 on brake shoe 12 and web 15 on brake shoe 14 to maintain a predetermined running clearance between a first friction pad 42 of brake shoe 12 and a second friction pad 44 of brake shoe 14 with a drum 46. A first spring 48 connected to web 13 and to an indexing lever 64 that is pivotally retained on pin 66 that extends from the second web 15 urges the first ends 22,24 of the first 12 and second 14 brake shoes into engagement with the hydraulic actuator 26 and first 34 and a second 36 end members of the extendible strut mechanism 32 while a second spring 50 connected to webs 13 and 15 urges the second ends 28,30 of the first 12 and second 14 brake shoes into engagement with the anchor post 40. When an operator desires to effect a brake application, an input in the form of pressurized fluid is supplied to a chamber 74 in wheel cylinder 72 of the hydraulic actuator assembly 26 through which an actuation force is created that acts on piston assemblies 80, 82 located in bore 78 to move the first ends 22, 24 of webs 13 and 15 outward and bring friction pads 42, 44 into engagement with drum 46 to effect a first brake application.

The extendible strut mechanism 32 includes the first end member 34 that is separated by a rotatable stem or shaft 35 from the second end member 36. The stem or shaft 35 has a smooth cylindrical surface 31 thereon that is retained in a smooth bore 33 in the second end member 36, a surface thereon with a series of teeth that defines a star wheel 37 and a surface with threads 39 thereon which is mated with corresponding threads in a bore 34a the first end member 34. The indexing lever 64 of the adjustable strut mechanism 32 is pivotally attached to web 15 of brake shoe 14 by pin 66 and includes a blade or pawl 65 that cooperates with the teeth 37 to incrementally rotate the stem or shaft 35 to change and extend the length of the thereof and correspondingly adjust the length between the first end member 34 and second end member 36 to sustain a desired clearance "C" between the friction pads 42, 44 and surface 45 on drum 46.

Figure 2:
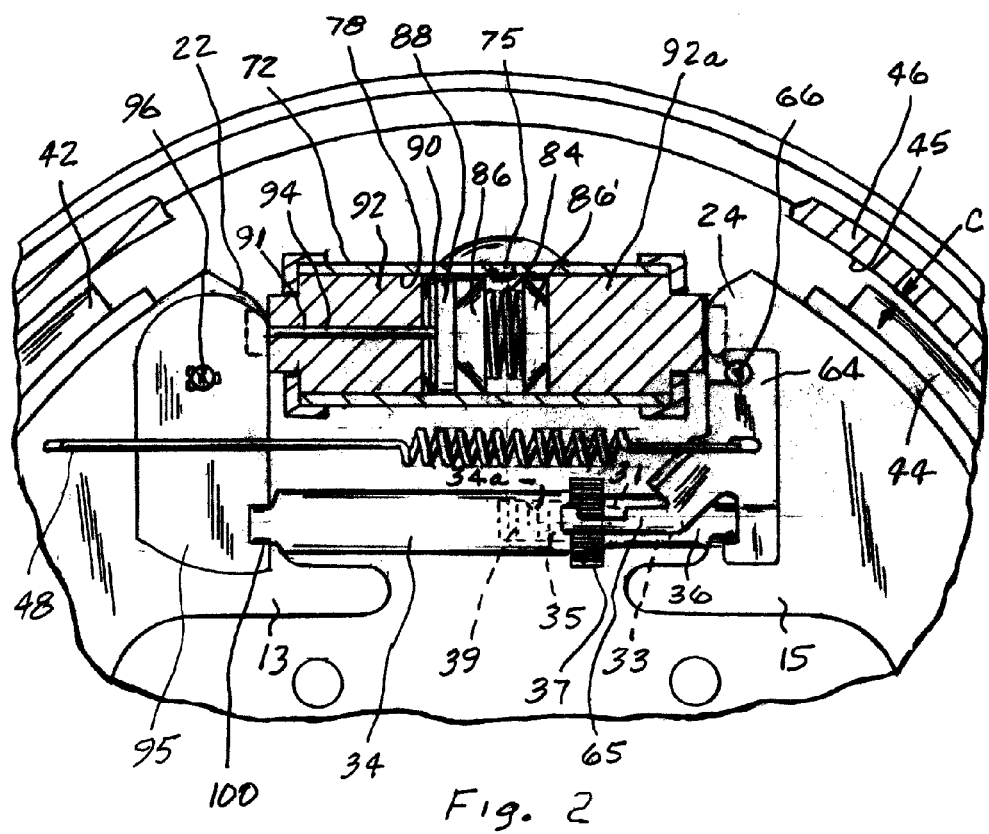
FIG. 2 is an enlarged sectional view of the wheel cylinder and adjuster arrangement for the drum brake of FIG. 1.
Figure 3:
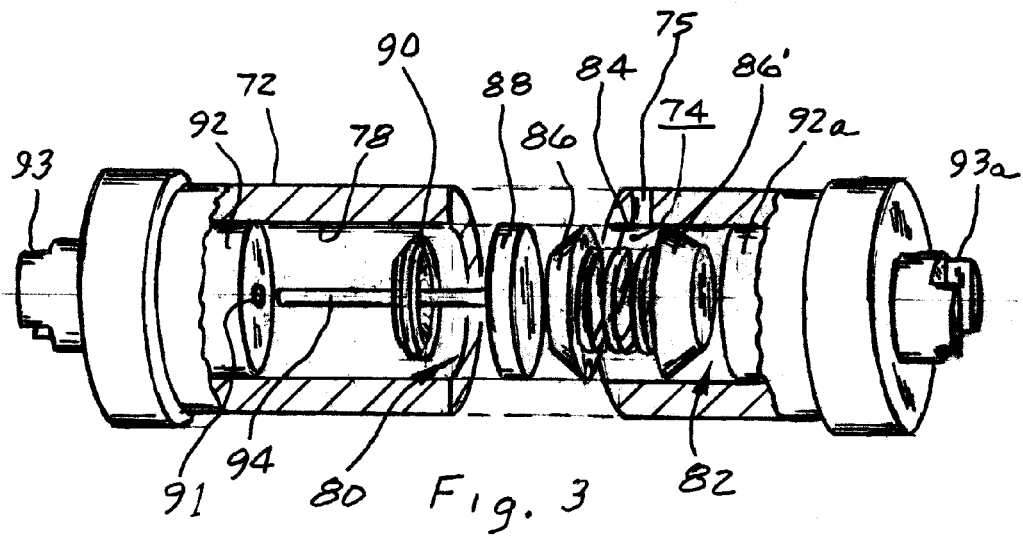
FIG. 3 is an exploded sectional view of a wheel cylinder of FIG. 1.
Figure 4:
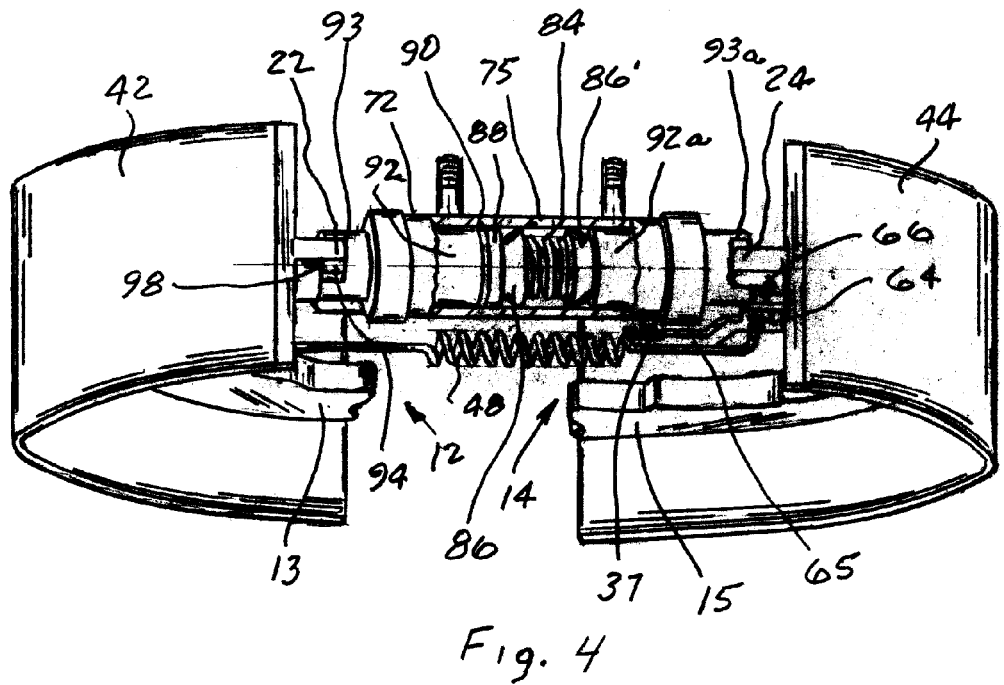
FIG. 4 is a top perspective view of the drum brake of FIG. 1.

The hydraulic actuator assembly 26, as shown in cross section in FIGS. 2, 3 and 4, includes the first piston assembly 80 and a second piston assembly 82 that are located in bore 78 of wheel cylinder 72 and spaced apart by a return spring 84 located between seal cups 86,86'. The first piston assembly 80 includes a plunger 88 that is connected through a resilient member (spring wave washer) 90 to a cylindrical body 92 that defines a linkage with the first web 13, a rod 94 that extends from the plunger 88 through a passage 91 in the cylindrical body 92 while the second piston assembly 82 is made up of a cylindrical body 92a that defines a linkage with the second web 15. Cylindrical body 92 has a slot 93 for receiving the first end 22 of web 13 while cylindrical body 92a has a slot 93a for receiving the first end 24 of web 15. Slots 93,93a are aligned with the axis of bore 78 such that forces are applied into the webs 13 and 15 without the introduction of side load forces.

The hydraulic actuator assembly 26 is further defined by a lever arm 95 that is pivotally retained on the first web 13 by pin 96. The first end 98 of lever arm 95 is located in slot 93 of cylindrical body 92 and aligned with passage 91 in cylindrical body 92 while a second end 100 is aligned with slotted end 34a on the first end member 34 of the adjustable strut mechanism 32. Return spring 84 acts through a linkage defined by cup seal 86, plunger 88, wave spring 90, cylindrical body 92, and the first end 98 of the lever arm 95 to hold the second end 100 against the slotted end 34a of the first end member 34 and form a connection between the hydraulic actuator assembly 26 and the extendible strut mechanism 32 and limit the effect of an actuation force on the extension of the strut 35 per a brake application.

Mode of Operation

Figure 5:
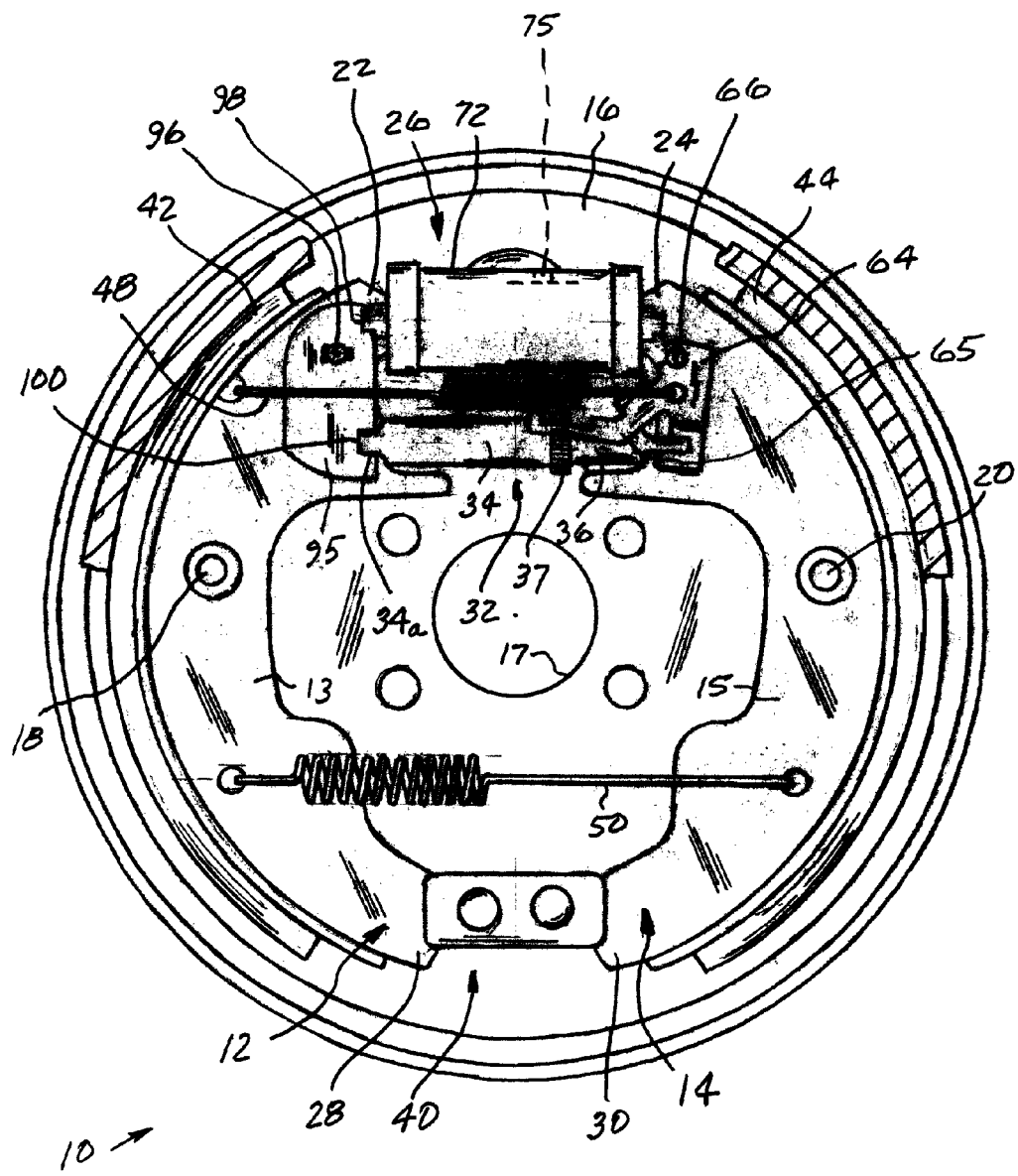
FIG. 5 is schematic illustration of a drum brake according to the present invention during a brake application.

When an operator desires to effect a brake application, pressurized fluid is supplied through opening 75 into chamber 74. The pressurized fluid acts on the cup seals 86, 86' to create a force that acts on plunger 88 of the first piston assembly 80 and is carried through wave washer 90 into cylindrical body 92 and directly acts on cylindrical body 92a of the second piston assembly 82 to moves the first ends 22, 24 through the running clearance C and into engagement with surface 45 on the drum to effect a brake application as illustrated in FIG. 5. As the web 13 and second web 15 moves away from the wheel cylinder 72, spring 48 pulls on the indexing lever 64 causing it to pivot about pin 66 and move pawl 65 with respect to the teeth on star wheel 37. Should the pivoting of the indexing lever 64 move pawl 65 past a tooth during a brake application when the brake application terminates the return spring 48 moves the first 13 and second 15 webs to a position of rest as illustrated in FIG. 1. As the first 13 and second 15 webs move to the position of rest, the return spring 48 act on the indexing lever 64 such that pawl 65 engages a tooth on the star wheel 37 to rotate the threads 39 with respect to the threads in the first end member 34 to lengthen the strut 35 and correspondingly change or limit the running clearance "C" to a maximum dimension.

Figure 6:
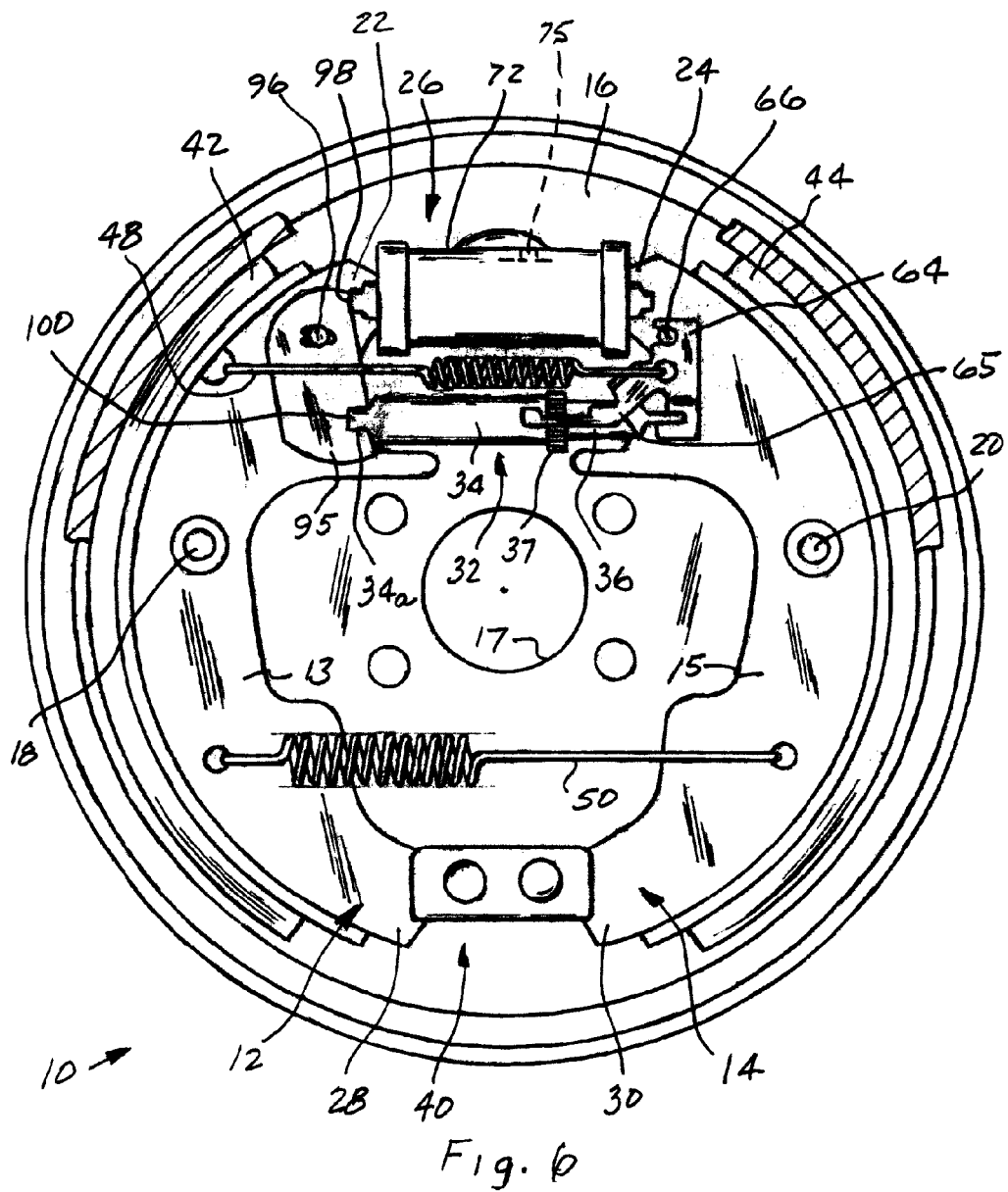
FIG. 6 is schematic illustration of a drum brake according to the present invention during a brake application when an operational force exceeds a predetermined fluid pressure.

During a brake application should the fluid pressure supplied to chamber 74 exceed a predetermined value as defined by the wave washer 90, the wave washer 90 collapses and now the actuation force is directly applied to cylindrical member 92, as illustrated in FIG. 6. As the wave washer 90 collapses, rod 94 moves with respect to cylindrical member 92 and acts on the first end 98 of lever arm 95 causing the lever arm 95 to pivot on pin 96 and supply the first end member 34 with a reaction force through the second end 100. The reaction force applied to the first end member 34 is carried through strut 35 into the second end member 36 to act on the indexing lever 64 and causing the indexing lever 64 to rotate in a counter direction as compared with the rotation caused by the pull of spring 48 such that the pawl 65 does not engages a tooth of star wheel 37 and as a result the length remains the same and a current running clearance before the brake application is maintained and not effected by an increase in the movement of the webs 13 and 15 from the pressurized fluid above a predetermined value. Thus, an adjustment of the extendible strut mechanism 32 is limited to a maximum of a single tooth of the star wheel 37 during a brake application.

What is claimed is:

1. A drum brake for a vehicle including an adjuster arrangement with an extendable strut that is located between a first web of a first brake shoe and a second web of a second shoe through which a running clearance is established between the first and second shoes and a drum, said first and second brake shoes being retained on a backing plate that is fixed to the vehicle such that a first engagement end on each of the first and second webs is spaced apart by the extendable strut and a second engagement end of each of the first and second webs is aligned with an anchor on the backing plate, a first spring attached to the first web and connected to a pawl of the adjuster arrangement retained on the second web for urging the first engagement ends toward an actuator member and a second spring attached to the first and second webs for urging the second engagement ends toward the anchor such that in a position of rest the first and second brake shoes are positioned adjacent the drum with a minimum running clearance there between, said actuator member including first and second pistons that are responsive to an actuation input by respectively acting on the first and second webs and after overcoming the opposition to the first and second springs moving the first and second brake shoes from the position of rest through the running clearance and into engagement with the drum to effect a brake application, said adjuster arrangement including a first body that is connected to the first web and having a threaded bore therein, a second body that is connected to the second web and having a smooth bore therein and wherein the expandable strut is defined by a shaft with a threaded section that is mated with the threaded bore in the first body and a smooth section that is located in the smooth bore of the second body and a star wheel located between the threaded section and the smooth section, said pawl pivoting on said second web with movement of the first and second webs by the actuator member and when a predetermined pivotal movement occurs engaging the star wheel causing the threaded section to rotate with respect to the threaded bore and correspondingly lengthening the expandable strut to maintain the minimum running clearance, said first piston being characterized by a plunger that is connected through a resilient member to a linkage member connected to the first web, a rod that extends from the plunger and a lever arm that is pivotally retained on the first web, said rod engaging a first end of the lever arm and a second end of the lever arm engaging the first body of the adjuster arrangement, said operational input acting on said plunger and being communicated through the resilient member into the linkage member for moving the first web during a brake application, said resilient member resisting the operational input until a predetermined operational input overcomes the resilient member and allows the plunger to move toward the linkage member such that the rod acts on the first end of the lever arm causing the lever arm to pivot on the first web and apply a reactive force through the second end into the first body such that the pawl is held in a substantially stationary position and prevent the pawl from rotating the star wheel as a result of movement of the first web by the predetermined operational force to thereby retain a current running clearance.

2. The drum brake as recited in claim 1 wherein the resilient member is defined by a wave spring.

3. The drum brake as recited in claim 2 wherein the rod extends through a bore in the linkage member and said bore maintains the rod in alignment with the first end of the lever arm.

4. The drum brake as recited in claim 3 wherein operational input supplied to the first and second piston is pressurized fluid.

5. The drum brake as recited in claim 4 wherein said plunger engages the wave spring to define a solid link with the linkage member.

6. The drum brake as recited in claim 5 wherein the rotation of the star wheel by the pawl is limited to a single increment defined by a tooth on the star wheel during a single brake application.

7. In a drum brake for a vehicle having an adjuster arrangement with an extendable strut that is located between a first web of a first brake shoe and a second web of a second shoe and through which a running clearance is established between the first and second shoes and a drum, said adjuster arrangement including a shaft having a star wheel located between a threaded surface and a smooth surface with the threaded surface located in a bore of a first member that is connected to the first web and the smooth surface located in a bore of a second member that is connected to the second web, a pawl pivotally retained on the second web, a spring secured to the first web and connected to the pawl for urging the first and second webs toward each other, an actuator including first and second pistons that are responsive to pressurization fluid under the control an operator that respectively acts on the first and second webs and after overcoming the opposition to the spring moves the first and second brake shoes from a position of rest into engagement with the drum to effect a brake application, said spring on movement of the first and second webs acting on the pawl causing the pawl to pivot and when a predetermined movement occurs bringing the pawl into engagement with the star wheel and rotate the star wheel such the threaded section rotates with respect to the threaded bore and correspondingly lengthening the expandable strut to maintain a minimum running clearance between the first and second brake shoes and drum, said first piston being characterized by a plunger that is connected through a resilient member to a linkage member that is connected to the first web, a rod that extends from the plunger and a lever arm that is pivotally retained on the first web, said rod engaging a first end of the lever arm while a second end of the lever arm engages the first body of the adjuster arrangement, said pressurization fluid that acts on said plunger develops an operational force that is communicated through the resilient member to the linkage member for moving the first web during a brake application, said resilient member resisting the operational input until a predetermined operational force overcomes the resistance of the resilient member and allows the plunger to move toward the linkage member such that the rod acts on the first end of the lever arm causing the lever arm to pivot on the first web and apply a reactive force through the second end into the first member such that the pawl is held in a substantially stationary position to prevent the pawl from rotating the star wheel as a result the movement of the first web by the predetermined operational force is not reflected by a change in the length of the expandable strut and a current running clearance is retained between the first and second shoes and drum.

* * * * *